United States Patent
Yamaguchi et al.

(10) Patent No.: US 9,476,435 B2
(45) Date of Patent: Oct. 25, 2016

(54) 3-POSITION OPERATING ACTUATOR AND PERMANENT-MAGNET EDDY-CURRENT DECELERATION DEVICE

(71) Applicant: NIPPON STEEL & SUMITOMO METAL CORPORATION, Tokyo (JP)

(72) Inventors: Hiroyuki Yamaguchi, Tokyo (JP); Yozo Okuda, Tokyo (JP); Koken Yanagido, Tokyo (JP); Kenji Imanishi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/434,850

(22) PCT Filed: Feb. 12, 2014

(86) PCT No.: PCT/JP2014/053152
§ 371 (c)(1),
(2) Date: Apr. 10, 2015

(87) PCT Pub. No.: WO2014/126087
PCT Pub. Date: Aug. 21, 2014

(65) Prior Publication Data
US 2015/0330418 A1   Nov. 19, 2015

(30) Foreign Application Priority Data
Feb. 12, 2013  (JP) ................ 2013-023971

(51) Int. Cl.
| F15B 15/26 | (2006.01) |
| F15B 15/14 | (2006.01) |
| F16D 65/16 | (2006.01) |
| H02K 49/04 | (2006.01) |
| F15B 11/12 | (2006.01) |
| B60T 13/58 | (2006.01) |
| B60T 13/74 | (2006.01) |
| F16D 63/00 | (2006.01) |
| F16D 121/04 | (2012.01) |
| F15B 15/20 | (2006.01) |
| F16D 121/20 | (2012.01) |

(52) U.S. Cl.
CPC ......... *F15B 15/1409* (2013.01); *B60T 13/586* (2013.01); *B60T 13/748* (2013.01);
(Continued)

(58) Field of Classification Search
CPC ... F15B 11/22; F15B 11/076; F15B 11/0365; B25B 27/146; C04B 22/148
USPC .................. 91/170 R, 399; 92/23, 129, 151; 188/129, 134, 164, 304, 310, 312
See application file for complete search history.

(56) References Cited

U.S. PATENT DOCUMENTS

| 3,190,077 A | * | 6/1965 | Scholin | ................ F15B 11/076 91/399 |
| 3,288,036 A | * | 11/1966 | Fisher | ................ F15B 11/0365 92/129 |

(Continued)

FOREIGN PATENT DOCUMENTS

| JP | 64-53607 | 4/1989 |
| JP | 01-298948 | 12/1989 |

(Continued)

*Primary Examiner* — Christopher Schwartz
(74) *Attorney, Agent, or Firm* — Clark & Brody

(57) ABSTRACT

A braking actuator uses a single cylinder without using a spring to achieve a 3-position operation. A partition plate and an intermediate check plate are affixed within a cylinder at suitable intervals in the axial direction. Inserted movably in the axial direction of the cylinder are a first piston disposed between a pressing lid and the intermediate check plate, a second piston disposed between the intermediate check plate and the partition plate, and a third piston disposed between the partition plate and a pressing lid. A rod which is axially movable within the cylinder has a base end attached to the third piston and a tip end which extends outside from the cylinder through the partition plate, the second piston, the intermediate check plate, the first piston, and the pressing lid. A stopper affixed to a middle portion of the rod moves the first piston or the second piston.

6 Claims, 7 Drawing Sheets

(52) U.S. Cl.
CPC .......... *F15B 11/123* (2013.01); *F15B 15/149* (2013.01); *F15B 15/26* (2013.01); *F16D 63/002* (2013.01); *F16D 65/16* (2013.01); *H02K 49/043* (2013.01); *F15B 2015/206* (2013.01); *F16D 2121/04* (2013.01); *F16D 2121/20* (2013.01)

(56) References Cited

U.S. PATENT DOCUMENTS

| | | | | |
|---|---|---|---|---|
| 3,385,172 | A | * | 5/1968 | Kaminga ............ F15B 11/0365 92/151 |
| 3,783,620 | A | * | 1/1974 | Moe ..................... F15B 11/22 60/547.1 |
| 5,064,029 | A | * | 11/1991 | Araki ................... H02K 49/043 188/164 |
| 5,219,050 | A | * | 6/1993 | Kubomiya ........... H02K 49/043 188/164 |
| 5,682,806 | A | * | 11/1997 | Kretzschmar ......... B25B 27/146 91/170 R |
| 6,474,215 | B1 | * | 11/2002 | Boyer .................. C04B 22/148 92/23 |
| 2014/0354381 | A1 | * | 12/2014 | Kohlhafer .............. H01H 50/20 335/179 |

FOREIGN PATENT DOCUMENTS

| | | |
|---|---|---|
| JP | 05-332328 | 12/1993 |
| JP | 06-165476 | 6/1994 |
| JP | 2002-101639 | 4/2002 |
| JP | 2005-048925 | 2/2005 |

* cited by examiner (a)

(b)

(a)

(b)

(c)

3-POSITION OPERATING ACTUATOR AND PERMANENT-MAGNET EDDY-CURRENT DECELERATION DEVICE

TECHNICAL FIELD

The present invention relates to a 3-position operating actuator which enables braking control in three positions, and a permanent-magnet eddy-current deceleration device equipped with this actuator.

BACKGROUND ART

In large vehicles such as buses and trucks, foot brakes (friction brakes) are used as principal brakes, and engine brakes or exhaust brakes are used as auxiliary brakes. In recent years, as the engines installed in vehicles have increasingly small displacement, the capacity of engine brakes and exhaust brakes has decreased, resulting in a greater number of cases in which auxiliary brakes have been enhanced by introducing eddy-current devices.

Recently, many such eddy-current devices no longer require current to be applied when braking because they use a permanent magnet as a magnetic pole (e.g., Patent Reference 1). At present, many of these permanent-magnet eddy-current deceleration devices are of the single-row rotation type or the double-row rotation type.

Among these, FIG. 6 illustrates an example of the structure of the single-row rotation type.

In FIG. 6, Reference Numeral 2 is a supporting member formed from a non-magnetic material such as aluminum which is immobilized and supported in a bearing case 1, and which supports a magnet support ring 4 so that it freely rotates via a bearing 3. On the peripheral surface of this magnet support ring 4, a plurality of permanent magnets 6 form an arc having the same radius in a cross-section taken in a direction perpendicular to the center of the rotational axis 5, and the upper and lower magnetic polar surfaces thereof are fixed at equal intervals on the same circumference. In addition, a plurality of pole pieces 7 formed from strong magnets are arranged at equal intervals on the same circumference via a supporting member 8 of a non-magnetic material, and affixed integrally to the supporting member 2 so as to face the outer surfaces of the group of permanent magnets 6. A rotor 9 fits into the rotational axis 5, and a cylindrical portion 9a thereof is caused to face the pole piece 7 so that it has a specified gap, and an actuator is mounted on the circumference in order to rotate the magnet support ring 4 on the supporting member 2.

FIG. 7 illustrates an example of the structure of the double-row rotation type. The description below describes only the items that differ from the single-row rotation type, and the parts having the same structure will be omitted.

The double-row rotation type has two magnet support rings 4a and 4b which are arranged in parallel on the supporting member 2. While one magnet support ring 4a is immobilized and supported on the supporting member 2, the other magnet support ring 4b is supported so that it rotates freely via the bearing 3. On the outer circumference of the magnet support ring 4a on the immobilized side (referred to below as a fixed support ring) and on the magnet support ring 4b on the rotating side (referred to below as a rotating support ring) are arranged a plurality of permanent magnets 6a and 6b, as above. In addition, a plurality of pole pieces 7 are arranged as above, at equal intervals on the same circumference on a supporting member 8, and provided integrally with the supporting member 2, so as to face the outer surfaces of the group of permanent magnets 6a and 6b arranged on the fixed support ring 4a and the rotating support ring 4b.

FIG. 6 (b) and FIG. 7 (b) illustrate the relative positions of the permanent magnets 6, 6a, and 6b and the pole piece 7 when in a braking state, and FIG. 6 (b) and FIG. 7 (c) illustrate the relative positions of the permanent magnets 6, 6a, and 6b and the pole piece 7 when in a non-braking state.

Large vehicles such as trucks and buses have a pre-installed compressed air source. Therefore, rotation of the magnet support ring 4 or the rotating support ring 4b is accomplished by an actuator such as an air cylinder via a yoke link 10 which protrudes from the side surface of the magnet support ring 4 or the rotating support ring 4b.

The actuator utilizes a 3-position operating actuator which is able to switch the braking force in two stages by restricting the position of the permanent magnets to three positions. An example of the 3-position operating actuator is described below.

In Patent Reference 2, for example, a stepped piston formed on the inside of a cylinder opening to a small-diameter end surface is inserted into a large-diameter hole of a stepped cylinder with large-diameter holes and small-diameter holes formed on the inside. A rod which extends outward and which passes through an end wall on the large-diameter side of the stepped piston and an end wall of the large-diameter side of the stepped cylinder joins with the piston inserted into the cylinder, and a spring is disposed between the end wall of the stepped piston and the piston.

However, in the case of the actuator disclosed in Patent Reference 2, which uses a spring to achieve 3-position control, there is required a force powerful enough to compress the spring, in addition to requiring a force to change the position of the permanent magnet. Therefore, because a large force is needed and a large piston is needed, the device has to be increased in size, which makes it difficult to install in a vehicle. Moreover, since the cylinder and the piston are stepped, these parts are of a complex shape and therefore become costly to produce.

Accordingly, in order to solve the problems of Parent Reference 2, the present inventors proposed Patent Reference 3, which discloses a 3-position operating actuator which uses two cylinders.

Instead of using parts with complex shapes, as in the case of the actuator proposed in Patent Reference 2, the actuator proposed in Patent Reference 3 achieves 3-position control without increasing the size of the actuator beyond what is necessary.

However, since two cylinders are needed, the overall size of the device increases, the weight also increases, and it becomes difficult to install it in a vehicle. There was a further problem in that additional conduit was necessary to connect the two cylinders.

PRIOR ART REFERENCES

Patent Reference

Patent Reference 1: Japanese Patent Application Kokai Publication No. H01-298948

Patent Reference 2: Japanese Patent Application Kokai Publication No. H05-332328

Patent Reference 3: Japanese Patent Application Kokai Publication No. 2002-101639

SUMMARY OF THE INVENTION

Problems to be Solved by the Invention

One problem which the present invention aims to solve is that, in the case of a 3-position operating actuator using a spring, the piston has to be increased in size, so the device increases in size, making it difficult to install in a vehicle. Another problem which the present invention aims to solve is that, in the case of a 3-position operating actuator using two cylinders, it becomes difficult to install in a vehicle, and additional conduit is necessary to connect the two cylinders.

Means for Solving these Problems

The 3-position operating actuator according to the present invention employs the structure described below in order to achieve a 3-position operation using a single cylinder, without using a spring.

The 3-position operating actuator according to the present invention comprises:

a cylinder having both ends closed by pressing lids which are integral with or separate from the cylinder;

a partition plate and an intermediate check plate affixed within the cylinder at suitable intervals in an axial direction;

a first piston axially movable within the cylinder between one of the pressing lids and the intermediate check plate;

a second piston axially movable within the cylinder between the intermediate check plate and the partition plate;

a third piston axially movable within the cylinder between the partition plate and the other of the pressing lids;

a rod axially movable within the cylinder, wherein the rod has a base end attached to the third piston and a tip end which extends outside from the cylinder through the partition plate, the second piston, the intermediate check plate, the first piston, and one of the pressing lids; and a stopper affixed to a middle portion of the rod to move the first piston or the second piston when the rod moves.

As described below, the present invention supplies fluid to the actuator or discharges fluid from the actuator, with the tip end of the rod set at a braking OFF position, a partial braking position (weak braking), or a braking ON position (strong braking).

(Braking OFF Position)

While fluid is supplied between the third piston and the partition plate, and also between one of the pressing lids and the first piston, a passageway for supplying fluid between the partition plate and the second piston and between the third piston and the other of the pressing lids is opened to the atmosphere. Of these two operations, supplying fluid between the third piston and the partition plate results in the third piston pushing against the other of the pressing lids to reduce amount of extension of the rod from the cylinder to a minimum. The movement of the rod results in the second piston being pushed by the stopper and moving to a position in closest proximity to the partition plate. On the other hand, as a result of fluid being supplied between one of the pressing lids and the first piston, the first piston is pressed toward the intermediate check plate.

(Partial Braking Position)

Starting from the braking OFF state, when fluid is supplied between the other of the pressing lids and the third piston, and also between the partition plate and the second piston, the second piston is moved until it makes contact with the intermediate check plate. Since the stopper is interposed between the first piston and the second piston, when the first piston and the second piston make contact with the intermediate check plate, the stopper is retrained by the open portion of the intermediate check plate, and the rod reaches a partial braking position. Since the third piston is affixed to the rod, when the first piston and the second piston make contact with the intermediate check plate and stop, the rod stops at an intermediate position in an axial direction between the other of the pressing lids and the partition plate.

(Braking ON Position)

Starting from the partial braking state, the supply of fluid is stopped between the third piston and the partition plate, and between one of the pressing lids and the first piston, and the supply passageway is opened to the atmosphere. This operation results in the third piston moving toward the partition plate, and this movement results in turn in the first piston being pressed by the stopper and moving toward one of the pressing lids. In addition, when the first piston is in contact with one of the pressing lids and is in a stopped state, amount of extension of the rod is at a maximum.

Advantageous Effects of the Invention

According to the present invention, there is no need for a large cylinder, it is possible to prevent an increase in dimensions of the device which occurs when two cylinders are used, and the device can be made light-weight and compact, with improved installation in a vehicle, because a spring is not used, and because it is possible to achieve a 3-position operation with a single cylinder. Moreover, in cases where electromagnetic valves are directly connected to the actuator, conduit becomes unnecessary, so the device can be made even more compact and light-weight.

BRIEF DESCRIPTION OF THE DRAWINGS

FIG. 2 (*b*) is a drawing illustrating a partial braking state in the 3-position operating actuator according to the present invention. FIG. 2 (*c*) is a drawing illustrating a braking ON state in the 3-position operating actuator according to the present invention.

FIG. 5 is a drawing illustrating the connecting portion when an actuator and a magnet rotating mechanism of a permanent-magnet eddy-current deceleration device having the 3-position operating actuator of the present invention are connected via a lever, where FIG. 5 (*a*) is when braking is OFF, and FIG. 5 (*b*) is when braking is ON.

PREFERRED EMBODIMENT

In the case of a 3-position operating actuator which uses a spring, the piston size increases and the device increases in size, and this interferes with installation in a vehicle. In the case of a 3-position operating actuator which uses two cylinders, it becomes difficult to install in a vehicle, and additional conduit is needed to connect the two cylinders.

The object of the present invention is to achieve a 3-position operation using a single cylinder, without the use of a spring. This object is achieved by implementing a 3-position operation by means of a first piston and a second piston which freely move along a rod within the cylinder, and a third piston attached to the rod, and which move within the cylinder.

EXAMPLE

The 3-position operating actuator according to the present invention is described using FIG. 1 to FIG. 3 below. Following that, there is a description of an example of a permanent-magnet eddy-current deceleration device using this 3-position operating actuator as an actuator of a braking ON-OFF switching device, making reference to FIG. 4 and FIG. 5.

Figure 1:
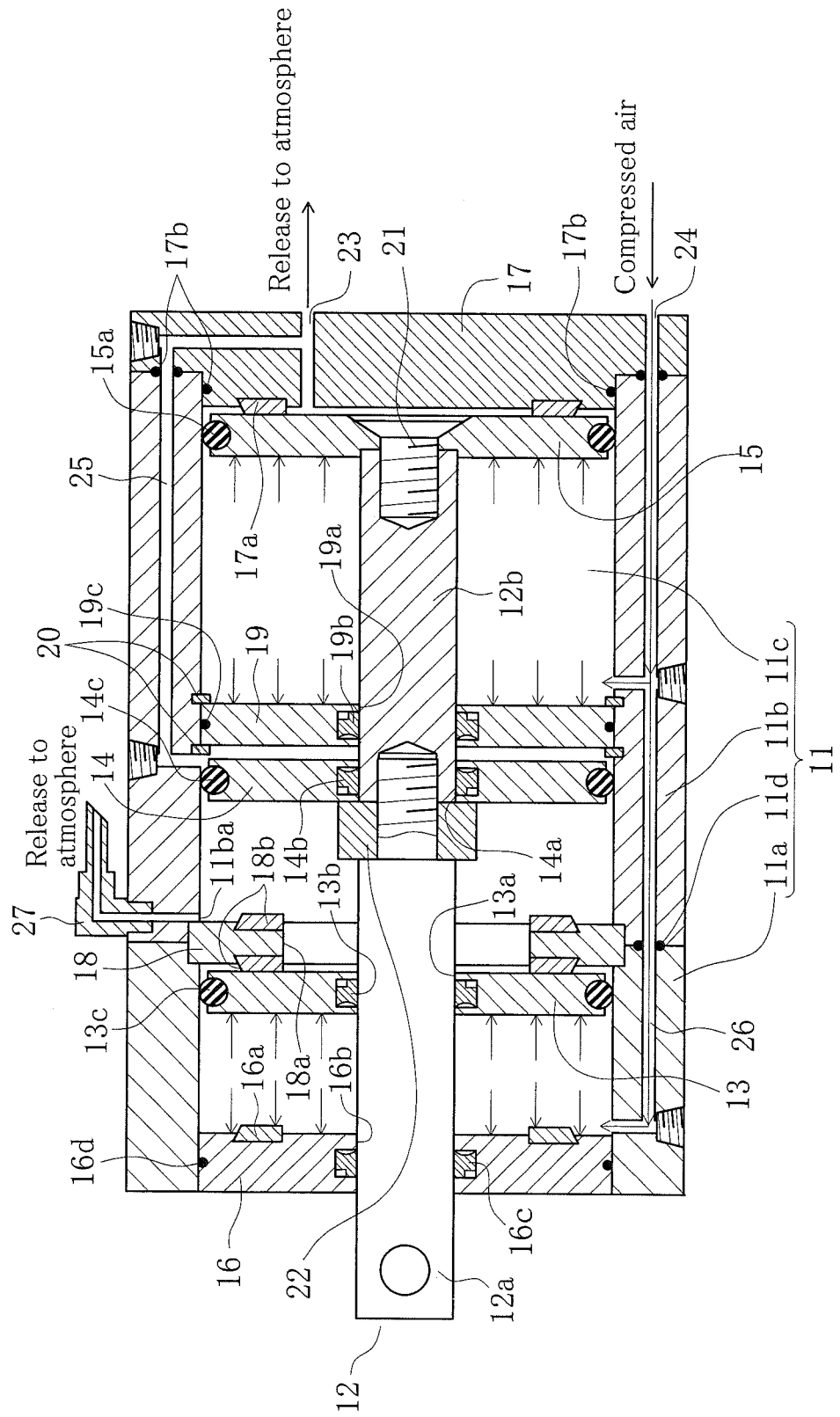
FIG. 1 is a schematic sectional view illustrating the structure of the 3-position operating actuator according to the present invention.
Figure 2:
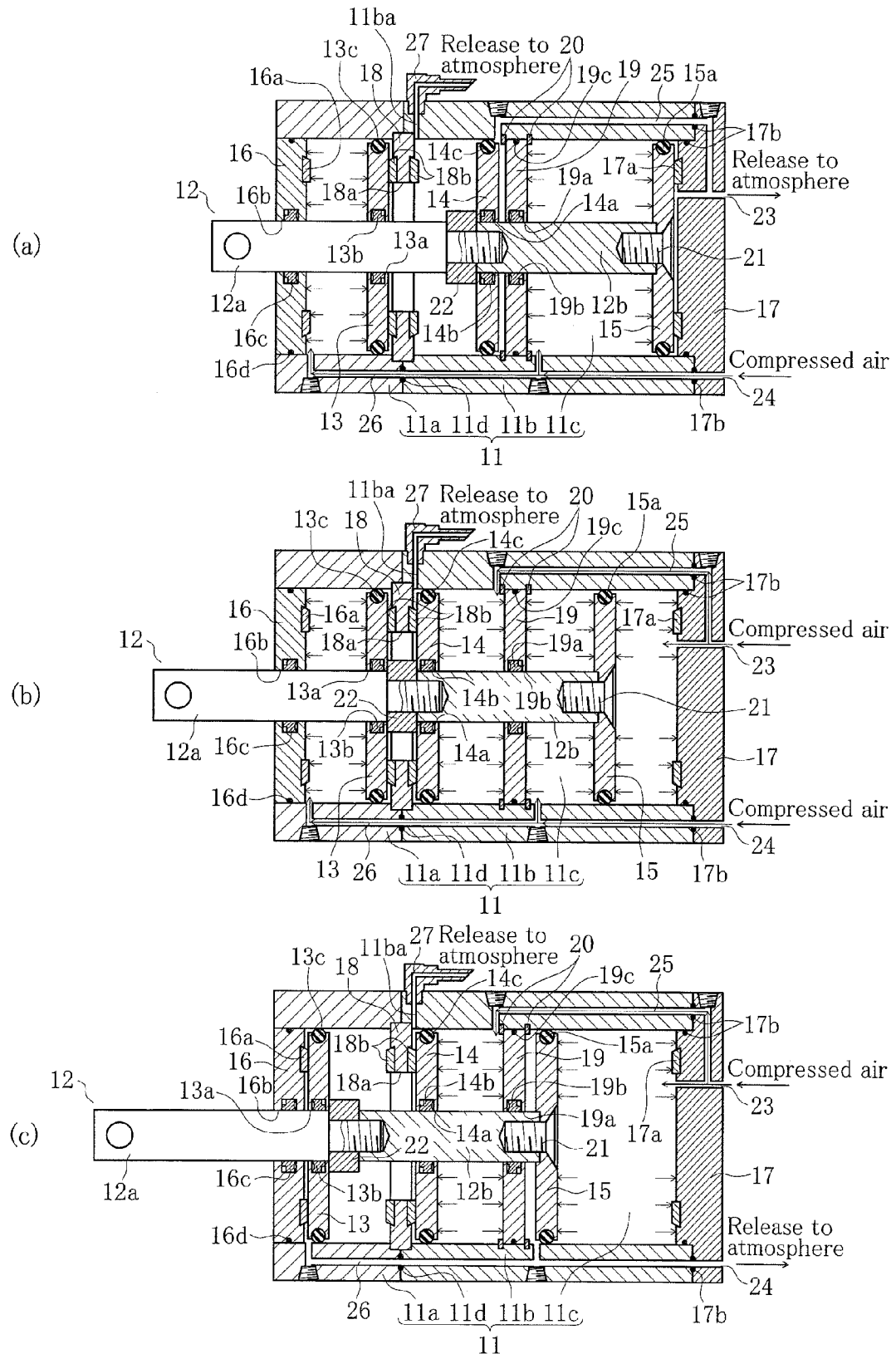
FIG. 2 (*a*) is a drawing illustrating a braking OFF state in the 3-position operating actuator according to the present invention.

FIG. 1 is a sectional view illustrating the 3-position operating actuator according to the present invention. FIG. 1 illustrates a structure whereby the tip end of a rod 12 determines the three positions of braking OFF, partial braking, and braking ON, according to the movements of the first piston 13, the second piston 14, and the third piston 15 provided to the rod 12 within a cylinder 11.

In the example shown in FIG. 1, the cylinder 11 has a structure in which a first cylinder section 11a at one end of the cylinder and a second cylinder section 11b at the other end of the cylinder are serially connected. In addition, one end of the first cylinder section 11a is sealed by a pressing lid 16, and the second cylinder section 11b is sealed by the other pressing lid 17, forming an interior sealed space 11c. Reference Numerals 16a and 17a are ring-shaped cushion pads which are disposed on the side of the sealed space 11c of the pressing lids 16 and 17, for example.

Reference Numeral 18 is an intermediate check plate which is held in place by the two cylinder sections 11a and 11b within the sealed space 11c formed by the first cylinder section 11a and the second cylinder section 11b, and at the center portion of the intermediate check plate 18 is provided an opening 18a large enough to accommodate a stopper 22 described below. In the example illustrated by FIG. 1, a ring-shaped cushion pad 18b is disposed on the peripheral top and bottom surfaces of the opening 18a.

Reference Numeral 19 is a partition plate affixed in the sealed space 11c at a middle portion of the second cylinder section 11b in an axial direction, and a through-hole 19a of the rod 12 is provided in the center. In FIG. 1, check rings 20 provided in the second cylinder section 11b at the top and bottom of the partition plate 19 affix the partition plate 19 to the second cylinder section 11b.

The first piston 13 is inserted within the cylinder 11 so as to freely move in an axial direction of the cylinder 11 between the pressing lid 16 and the intermediate check plate 18. Also, the first piston 13 has a through-hole 13a provided in its center for the rod 12, so that the first piston 13 can freely move with respect to the rod 12.

In addition, the second piston 14 is inserted within the cylinder 11 so as to freely move in an axial direction of the cylinder 11 between the intermediate check plate 18 and the partition plate 19. Also, the second piston 14 has a through-hole 14a provided in its center for the rod 12, so that the second piston 14 can freely move with respect to the rod 12.

In addition, the third piston 15 is inserted within the cylinder 11 so as to freely move in an axial direction of the cylinder 11 between the partition plate 19 and the other pressing lid 17, and is attached to the base end of the rod 12 with a locking screw 21.

Reference Numeral 22 is a stopper affixed to a middle portion of the rod 12 to move the first piston 13 or the second piston 14 when the rod 12 moves. The stopper 22 has almost the same thickness as the intermediate check plate 18 which has the cushion pad 18b on the top and bottom surfaces thereof In the example illustrated in FIG. 1, the rod 12 is formed with a first rod section 12a and a second rod section 12b connected serially, and the stopper 22 is immobilized by being interposed between the first rod section 12a and the second rod section 12b.

The 3-position operating actuator of the present invention as described above moves the tip end of the rod 12 in the three positions of braking OFF, partial braking (weak braking), and braking ON (strong braking) by supplying compressed air to a passageway or discharging the compressed air through the passageway, as shown in FIG. 1 for example.

Reference Numeral 23 is a first passageway for supplying or discharging compressed air between the other pressing lid 17 and the third piston 15, and forms a passageway through the other pressing lid 17.

Reference Numeral 24 is a second passageway, which passes through the other pressing lid 17, passing through the outer peripheral wall of the second cylinder section 11b, and is formed to supply or to discharge compressed air between the third piston 15 and the partition plate 19.

Reference Numeral 25 is a third passageway which branches off of the first passageway 23 to pass through the inner wall of the outer periphery of the second cylinder section 11b, and which is formed to supply or to discharge compressed air between the partition plate 19 and the second piston 14.

Reference Numeral 26 is a fourth passageway which branches off of the second passageway 24 to pass through the inner wall of the outer periphery of the second cylinder section 11b and the first cylinder section 11a, and which is formed to supply or to discharge compressed air between the pressing lid 16 and the first piston 13.

Reference Numeral 27 is a nozzle which releases to the atmosphere the air inside the space formed by the intermediate check plate 18 and the second piston 14. The nozzle 27 is disposed at a through-hole 11ba which passes through the outer peripheral wall of the second cylinder section 11b.

Rod packings 16c, 13b, 14b, and 19b which prevent leakage of air from voids formed at the rod 12 are provided at a through-hole 16b of the pressing lid 16, and at through-holes 13a, 14a, and 19a of the first piston 13, the second piston 14, and the partition plate 19. Piston packings 13c, 14c, and 15a which prevent leakage of air from voids formed at the cylinder 11 are provided on the outer peripheral surfaces of the first piston 13, the second piston 14, and the third piston 15.

In addition, O-rings 16d, 17b, 19c, and 11d which prevent leakage of air from these voids are provided at the surfaces where the pressing lid 16, the other pressing lid 17, and the partition plate 19 meet with the cylinder 12, and also at the surfaces where the first cylinder section 11a and the second cylinder section 11b meet.

Following is a description of how the tip end of the rod 12 is moved to the three positions of braking OFF, partial braking (weak braking), and braking ON by supplying and discharging compressed air to the 3-position operating actuator of the present invention as described above.

(Braking OFF Position: See FIG. 2 (a))

Compressed air is supplied between the third piston 15 and the partition plate 19 through the second passageway 24, and between the pressing lid 16 and the first piston 13 through the fourth passageway 26. On the other hand, the first and third passageways 23 and 25 are open to the atmosphere. As a result of supplying and discharging the compressed air, the first piston 13, the second piston 14, and the third piston 15 move the inner portion of the sealed space 1c in the direction of the intermediate check plate 18, the partition plate 19, and the other pressing lid 17.

Thus, by supplying compressed air through the second passageway 24, and by discharging compressed air from the first passageway 23, the third piston 15 is pushed against the other pressing lid 17, so the amount of extension of the rod 12 from the cylinder 11 is the least.

As a result of the movement of the rod 12, the second piston 14 is pushed by the stopper 22, air is discharged from the third passageway 25, and the second piston 14 moves to a position closest to the partition plate 19. As a result of supplying compressed air passing through the fourth passageway 26, and as a result of discharging air from the nozzle 27, the first piston 13 is pushed against the intermediate check plate 18.

(Partial Braking Position: See FIG. 2 (b))

Starting from the braking OFF state, compressed air is further supplied through the first and third passageways 23 and 25 between the other pressing lid 17 and the third piston 15, as well as between the partition plate 19 and the second piston 14.

As a result of supplying compressed air through the third passageway 25 between the partition plate 19 and the second piston 14, the second piston 14 is moved so that it makes contact with the intermediate check plate 18.

As a result of the movement of the second piston 14, the stopper 22 also moves. Moreover, when the second piston 14 makes contact with the intermediate check plate 18, the stopper 22 is held between the first piston 13 and the second piston 14. In this state, the stopper 22 is restrained by the opening 18a of the intermediate check plate 18, and the amount of extension of the rod 12 is between that of the braking OFF position and the braking ON position, and is thus in the partial braking position.

When the first piston 13 and the second piston 14 make contact with the intermediate check plate 18, they stop, and the third piston 15 which is affixed to the rod 12 stops at an intermediate position in an axial direction between the other pressing lid 17 and the partition plate 19.

(Braking ON Position: See FIG. 2 (b))

Starting from the partial braking state, the supply of compressed air through the second passageway 24 is stopped between the third piston 15 and the partition plate 19, as well as through the fourth passageway 26 between the pressing lid 16 and the first piston 13, and the compressed air is released into the atmosphere.

When this happens, the third piston 15 moves toward the partition plate 19, and the first piston 13 is pushed by the stopper 22 and moves toward the pressing lid 16. When the first piston 13 comes into contact with the pressing lid 16, the motion of the rod 12 ceases, and the amount of extension of the rod 12 reaches a maximum.

In the case of the 3-position operating actuator of the present invention having the structure described above, a space demarcated by the pressing lid 16 and the separation plate 19 forms an operating chamber for controlling the partial braking position. Moreover, a space demarcated by the separation plate 19 and the other pressing lid 17 forms an operating chamber for controlling the two end positions, namely, braking OFF and braking ON.

By employing the above-described structure, the 3-position operating actuator of the present invention is able to achieve a 3-position operation with a single cylinder, without using a spring. Therefore, there is no need for the cylinder to be large, it is possible to prevent an increase in dimensions of the device which occurs when two cylinders are used, and the device can be made light-weight and compact, with improved installation in a vehicle.

Figure 3:
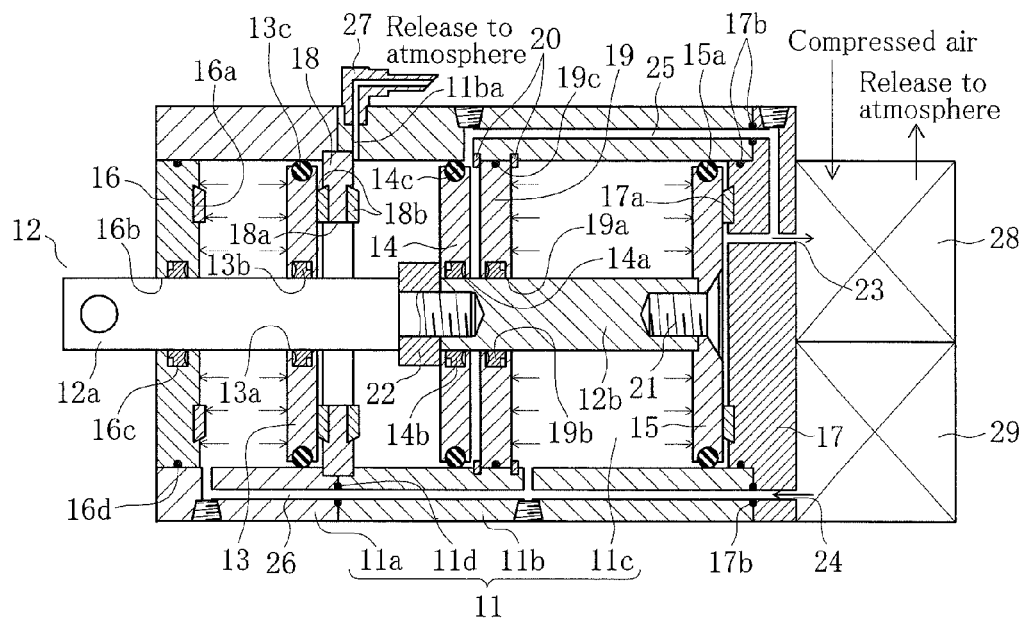
FIG. 3 is a drawing illustrating a 3-position operating actuator according to the present invention to which are directly connected electromagnetic valves, where FIG. 3 (*a*) is a drawing illustrating the position of installation of the electromagnetic valves, and FIG. 3 (*b*) is a drawing illustrating the construction of the installed electromagnetic valves.
Figure 3:
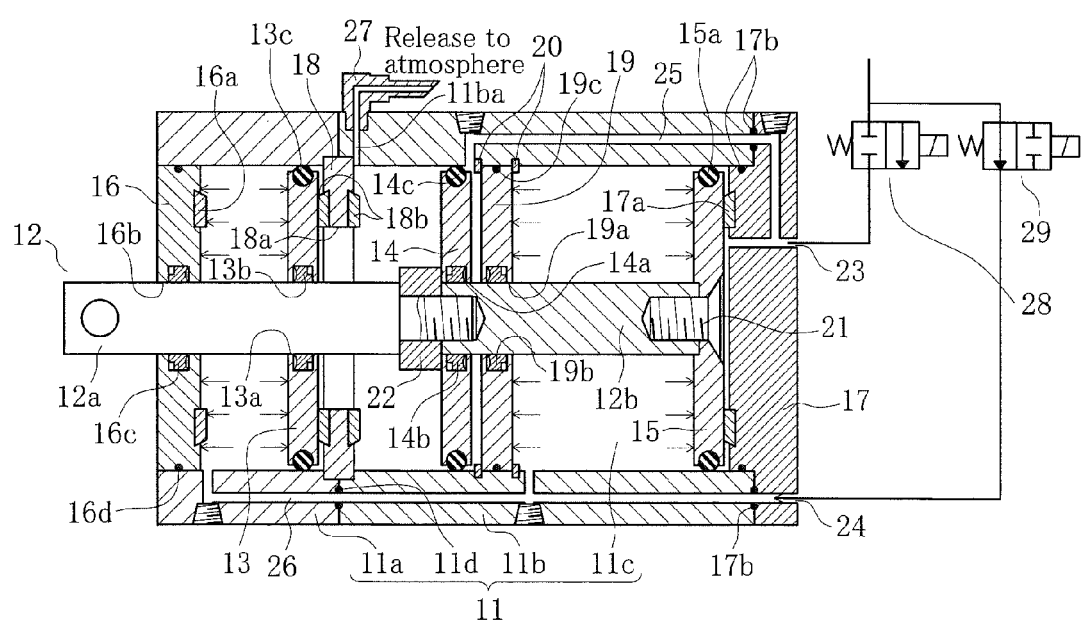

As shown in FIG. 3 (a), the 3-position operating actuator of the present invention can be built so that it does not require conduit between the electromagnetic valves 28, 29 and the actuator, because the electromagnetic valves 28, 29 are directly connected to the first and third passageways 23, 25 and the second and fourth passageways 24, 26. Therefore, the device can be made even more compact and light-weight.

Of the electromagnetic valves 28, 29, the electromagnetic valve 28 which is connected to the first and third passageways 23, 25, is a normally closed single-acting valve having two ports. The electromagnetic valve 29 which is connected to the second and fourth passageways 24, 26, is a normally open single-acting valve having two ports (see FIG. 3 (b)).

Figure 6:
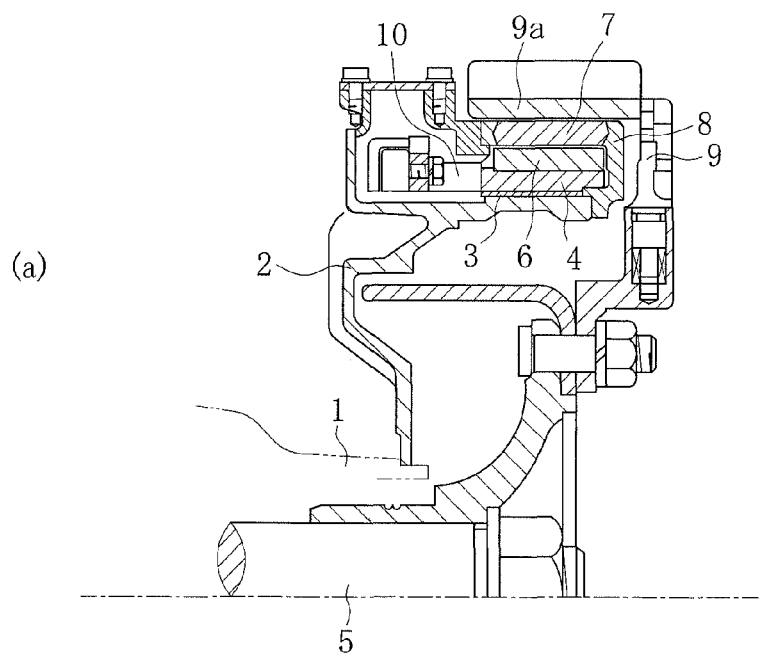
FIG. 6 is a drawing illustrating a single-row rotation type permanent-magnet eddy-current deceleration device, where FIG. 6 (*a*) is a sectional view in the direction of the axis of rotation, FIG. 6 (*b*) is a drawing illustrating the magnetic circuit structure during braking, and FIG. 6 (c) is a drawing illustrating the magnetic circuit structure when there is no braking.
Figure 6:
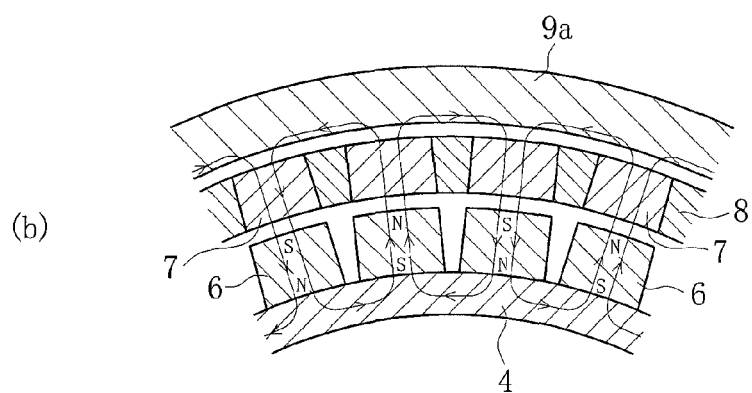
Figure 6:
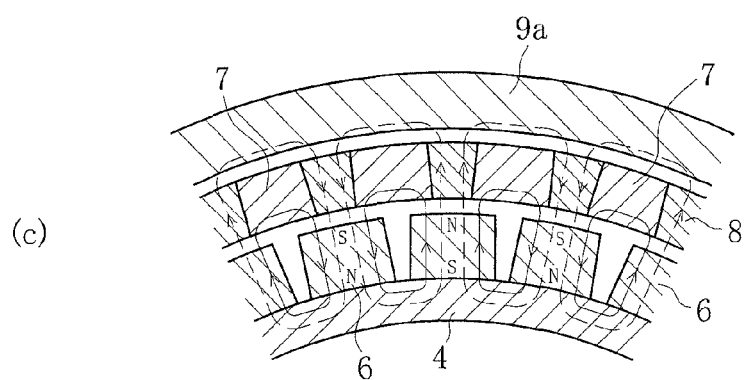
Figure 7:
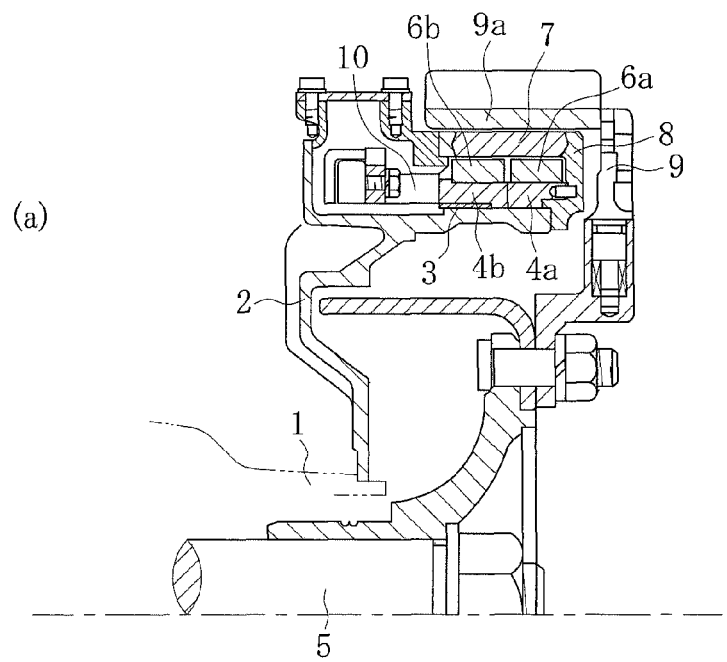
FIG. 7 is a drawing illustrating a double-row rotation type permanent-magnet eddy-current deceleration device, presented in a similar manner as in FIG. 6.
Figure 7:
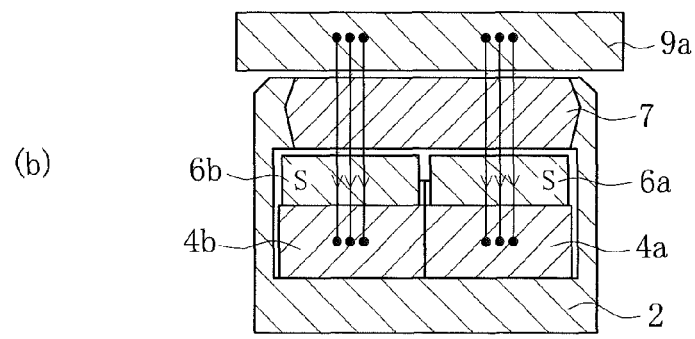
Figure 7:
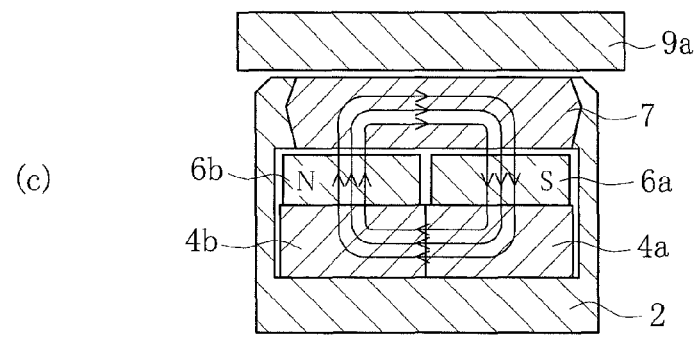

The permanent-magnet eddy-current deceleration device of the present invention is illustrated in FIG. 6 and FIG. 7. The 3-position operating actuator of the present invention having the structure described above is used as an actuator of a braking ON-OFF switching device in a single-row rotation type or a double-row rotation type eddy-current deceleration device.

In this case, the direct linkage to the rod 12 of the 3-position operating actuator of the present invention is not limited to the rotating portion of the magnetic support ring 4, but the connection may also be made via a lever mechanism.

Figure 4:
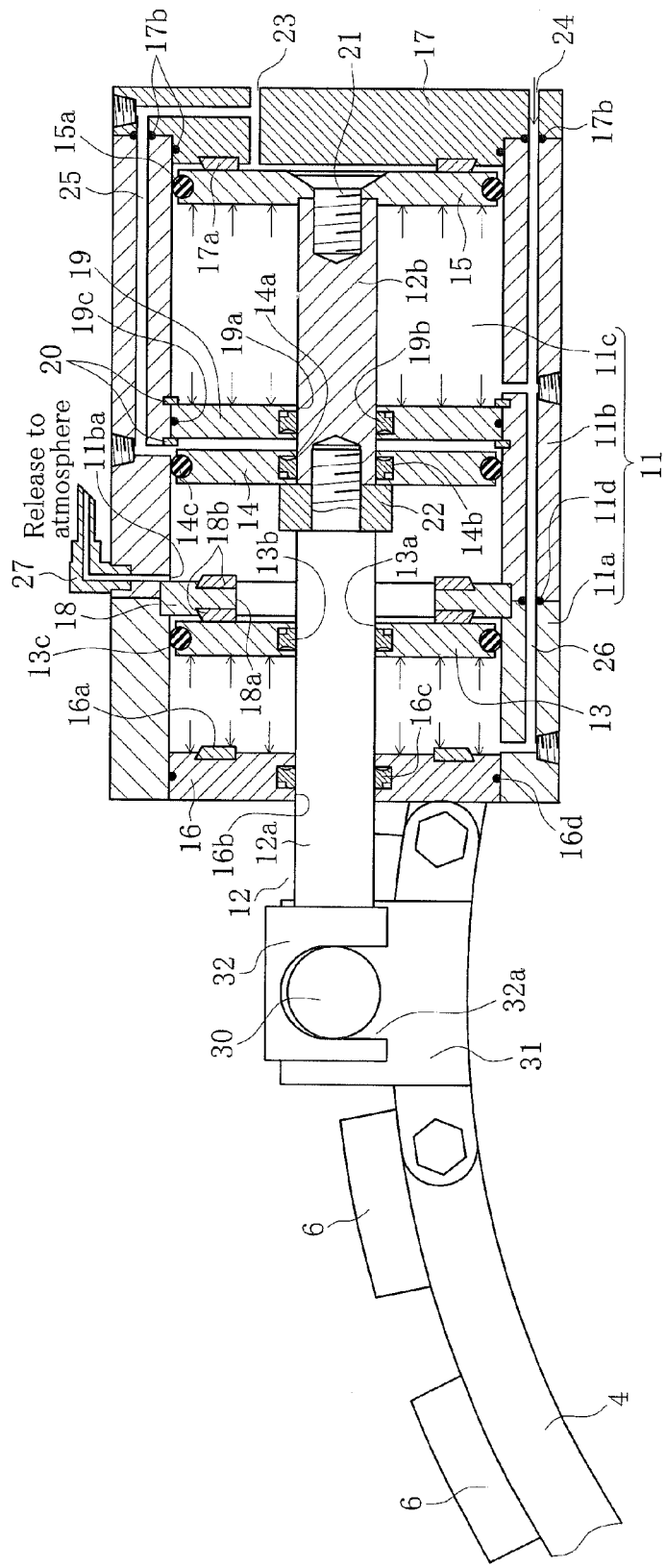
FIG. 4 is a drawing illustrating the connecting portion when an actuator and a magnet rotating mechanism are directly connected in a permanent-magnet eddy-current deceleration device having the 3-position operating actuator according to the present invention.

FIG. 4 is a drawing illustrating an example of direct linkage between the 3-position operating actuator of the present invention and the rotating portion of the magnet support ring 4. FIG. 4 shows an example of linkage, where a stand 31 from which a cam follower 30 projects is attached to the magnet support ring 4, and there is provided a connecting fixture 32 formed with a U-shaped groove 32a which engage with the cam follower 30 at the tip end of the rod 12.

Figure 5:
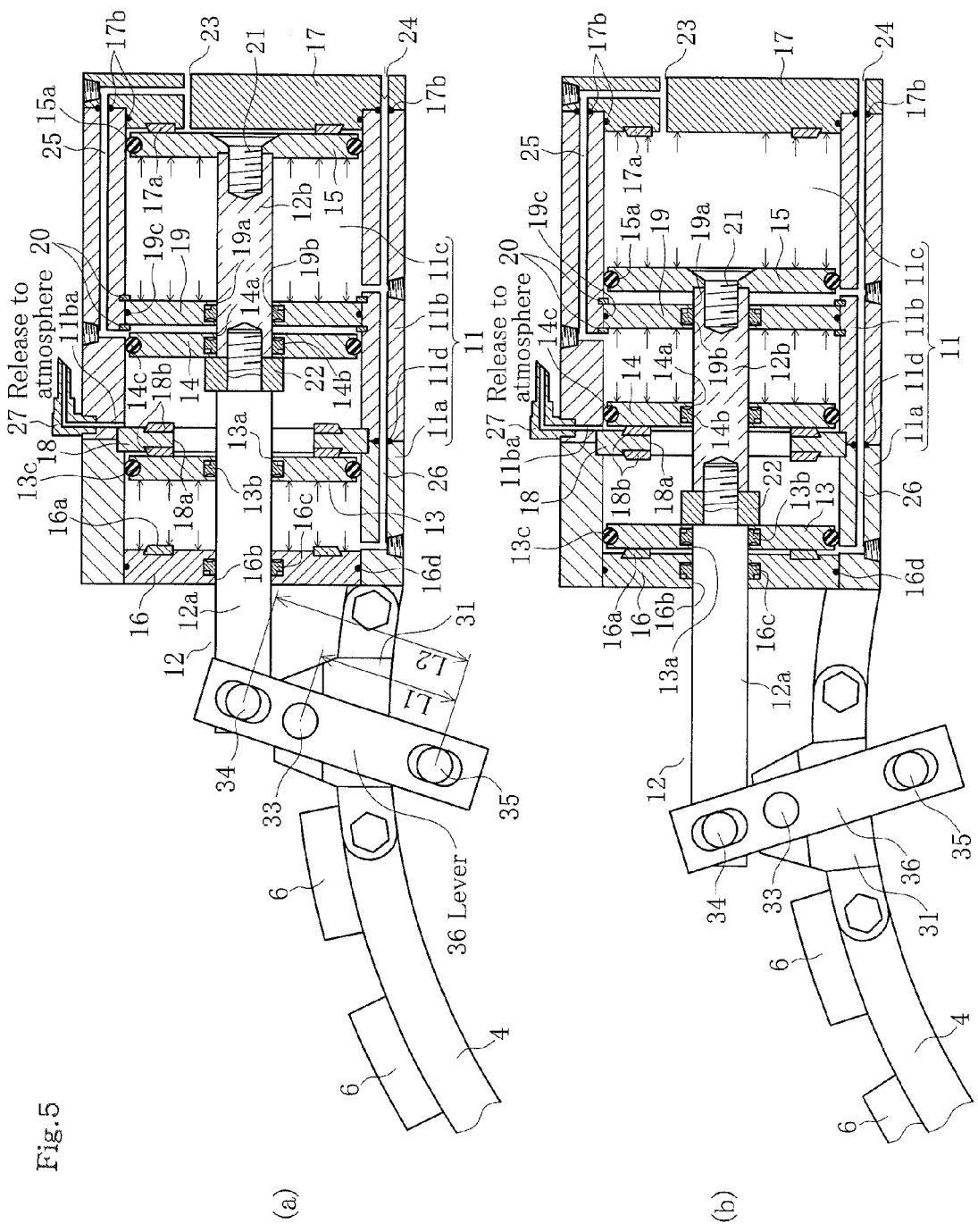

FIG. 5 is a drawing illustrating an example in which the 3-position operating actuator of the present invention and the rotating portion of the magnet support ring 4 are linked via a lever mechanism. The example in FIG. 5 shows a stand 31 from which a pin 33 projects, and the tip end of the rod 12 has a pin 34 and a housing of an eddy-current deceleration device has a pin 35, and these pins 33-35 are linked with a lever 36 so as to freely rotate. In this example, the distance L2 from the pin 35 to the pin 34 provided at the tip end of the rod 12 is greater than the distance L1 from the pin 35 provided to the housing to the pin 33 which projects from the stand 31. This makes it possible to produce the same rotational force with a cylinder that is smaller than in the case of direct linkage illustrated in FIG. 4.

The present invention is, of course, not limited to the above-described example, and the preferred embodiment may, of course, be advantageously modified within the scope of the technical ideas recited in the claims.

For example, the positions of the operating chamber for controlling the partial braking position and the operating chamber for controlling the two end positions may be interchanged.

Use of the actuator of the present invention is not limited to a permanent-magnet eddy-current deceleration device, but it may also be used as a driving device to implement positional control of an exhaust valve of an exhaust brake, if a 3-position operation is required.

Moreover, the permanent-magnet eddy-current deceleration device of the present invention is not limited to a single-row rotation type or a double-row rotation type, but it can also be a disk-type such as disclosed in Japanese Patent Application Kokai Publication No. H01-234044, for example.

In the above examples, the actuator of the present invention is operated by using compressed air, but in the case of vehicles which do not have a pre-installed compressed air source, the actuator of the present invention may be operated using a gas other than compressed air or a fluid such as oil.

Moreover, the pressing lid 16 and the pressing lid 17 do not have to be separate from the cylinder 11, but may be integral with the cylinder 11, being formed as walls (end walls) at the end portions of the cylinder 12.

In the above description, when the amount of extension of the rod 12 was at a minimum, the permanent-magnet eddy-current deceleration device was in the braking OFF position, and when the amount of extension of the rod 12 was at a maximum, the permanent-magnet eddy-current deceleration device was in the braking ON position, but the connections may be set so that when the amount of extension of the rod 12 is at a maximum that is the braking OFF position, and when the amount of extension of the rod 12 is at a minimum that is the braking ON position.

In addition, the partial braking position does not have to be the intermediate position of the stroke (the amount of movement from the braking OFF position to the braking ON position) of the rod 12, but it can be any desired position between the braking OFF position and the braking ON position that enables the required braking force (weak or strong).

EXPLANATION OF THE REFERENCE NUMERALS

4 Magnet support ring
6 Permanent magnet
11 Cylinder
12 Rod
13 First piston
14 Second piston
15 Third piston
16 Pressing lid
17 Pressing lid
18 Intermediate check plate
19 Partition plate
22 Stopper
23 First passageway
24 Second passageway
25 Third passageway
26 Fourth passageway
27 Nozzle
28, 29 Electromagnetic valves
36 Lever

The invention claimed is:

1. A 3-position operating actuator comprising:
   a cylinder having both ends closed by pressing lids which are integral with or separate from the cylinder;
   a partition plate and an intermediate check plate affixed within the cylinder at suitable intervals in an axial direction;
   a first piston axially movable within the cylinder between one of the pressing lids and the intermediate check plate;
   a second piston axially movable within the cylinder between the intermediate check plate and the partition plate;
   a third piston axially movable within the cylinder between the partition plate and the other of the pressing lids;
   a rod axially movable within the cylinder, wherein the rod has a base end attached to the third piston and a tip end which extends outside from the cylinder through the partition plate, the second piston, the intermediate check plate, the first piston, and one of the pressing lids; and
   a stopper affixed to a middle portion of the rod to move the first piston or the second piston when the rod moves.

2. The 3-position operating actuator according to claim 1, further comprising:
   a first passageway formed in the other of the pressing lids for supplying or discharging a fluid between the other of the pressing lids and the third piston;
   a second passageway, a third passageway, and a fourth passageway formed in an outer peripheral wall of the cylinder for supplying or discharging a fluid between the third piston and the partition plate, between the partition plate and the second piston, and between one of the pressing lids and the first piston; and
   a nozzle installed in the cylinder for releasing to atmosphere a fluid inside a space formed by the intermediate check plate and the second piston.

3. A 3-position operating actuator according to claim 2, further comprising electromagnetic valves directly connected to the other of the pressing lids.

4. A 3-position operating actuator according to claim 3, wherein the electromagnetic valves comprise a normally closed, single-acting electromagnetic valve having two ports and a normally open, single-acting electromagnetic valve having two ports.

5. A permanent-magnet eddy-current deceleration device comprising the 3-position operating actuator according to claim 1 used as an actuator of a braking ON-OFF switching device.

6. The permanent-magnet eddy-current deceleration device according to claim 5, wherein the actuator and a magnetic rotation mechanism are connected via a lever.

* * * * *